April 18, 1961 I. NESSON 2,980,453
ARM COUPLING FOR WINDSHIELD WIPER ARMS
Filed Jan. 17, 1955
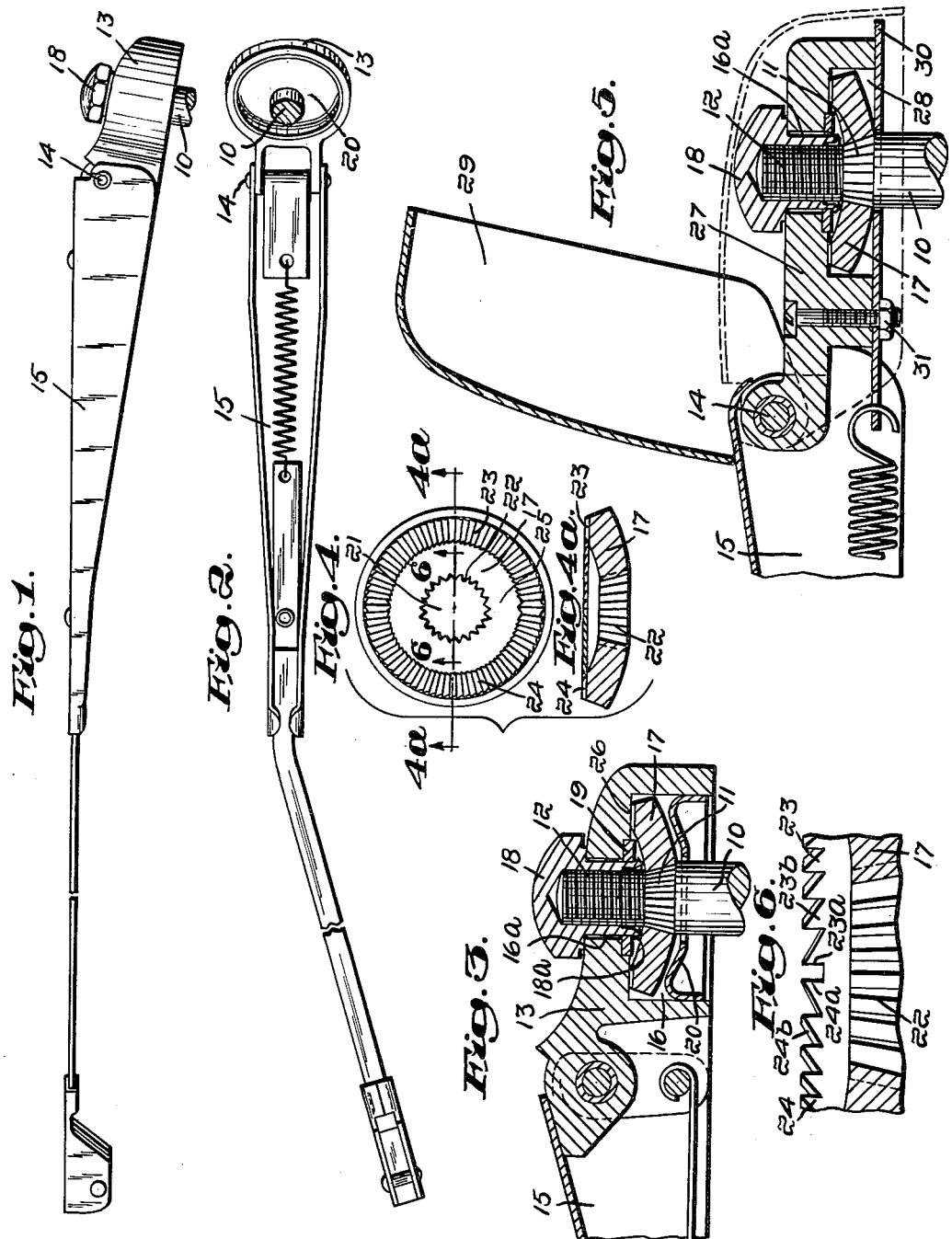
Inventor:
Israel Nesson,
by Arthur D. Thomson
Attorney

United States Patent Office 2,980,453
Patented Apr. 18, 1961

2,980,453

ARM COUPLING FOR WINDSHIELD WIPER ARMS

Israel Nesson, Lynn, Mass., assignor to
Max Zaiger, Swampscott, Mass.

Filed Jan. 17, 1955, Ser. No. 482,302

3 Claims. (Cl. 287—53)

This invention relates to couplings for connecting a windshield wiper arm to the drive shaft of the wiper motor.

A number of the types of motors now in use for operating windshield wipers have a shaft which terminates in a tapered shoulder leading to a reduced threaded end to which a nut can be attached. The shoulder is splined or serrated and is designed to engage a coupling bushing, having mating internal serrations. The mating serrations transmit the drive torque from the shaft to the bushing, which is fixed or keyed in some manner to the arm. The bushing may be adjusted rotationably with respect to the arm when the parts are disengaged. As this adjustment is limited to discrete steps, dependent on the width of the serrations, additional adjustment is sometimes provided in the coupling. My previous Patent No. 2,417,991 is an example of a coupling which permits fine, unlimited rotational adjustment of the arm with respect to the shaft, without disengaging the bushing from the shoulder. The present invention is an improvement over that disclosed in the aforesaid patent. The general object of this invention is to provide a coupling for a windshield wiper arm which permits unlimited adjustment of the arm, adequately transmits the drive torque to the arm, and is yet compact and simple in construction, and is less expensive to manufacture and easier to assemble on the shaft than couplings hitherto devised.

The coupling consists in general of a housing, to which the arm is hinged, containing a ring having a tapered hole in the center with a serrated wall for engagement with the splined shoulder of the shaft, and also having a row of teeth disposed around one of its faces, the teeth engaging, and tending to bite into, a surface of the housing. The ring is tightened both against the shaft and the housing by means of a nut threaded on the end of the shaft. Certain of the teeth are slanted to oppose clockwise rotation of the ring with respect to the housing and others are slanted to oppose counterclockwise rotation.

In the drawings illustrating the invention:

Fig. 1 is a side view of the connector assembled with the wiper arm;

Fig. 2 is a bottom view of the arm and connector;

Fig. 3 is an enlarged cross-section of the connector taken along a line running in the general radial direction of the arm;

Fig. 4 is a plan view of the serrated face of the ring;

Fig. 4a is a cross-section along line 4a—4a of Fig. 4;

Fig. 5 is an enlarged cross-section of a modification of the connector shown along the same line as Fig. 3; and Fig. 6 is an enlarged detail of a portion of the ring taken along line 6—6 of Fig. 4.

As shown in Figs. 3 and 5, the shaft 10 of the motor has a tapered splined shoulder 11 and a threaded end 12. A housing 13, preferably of cast metal, carries lugs 14 to which a wiper arm 15 of any appropriate construction is hinged. The housing has a recess 16 in which is seated the ring 17 which performs the locking function. The housing also has a hole 16a, communicating with the recess, in which a captive nut 18 is rotatably mounted, and projects through into the recess. The head of the nut engages the outside of the housing and the nut has a flaring lower rim 18a engaged by a washer 19 which keeps the nut from falling out. The rim may be spun over after assembly or, the washer may be split and snapped over the rim.

In the modification shown in Figs. 1, 2 and 3, the recess is closed by a cup-shaped bottom cover 20 which may be press-fitted or may be welded or otherwise secured after the lock ring is put in place. The ring 17 is freely movable in the housing. This ring has a tapered central hole 21, the walls of which carry serrations 22 which mate with the serrations on the shaft. The ring also has a row of teeth 23 and 24 around the margin of its upper face 25. It will be noted that the teeth 23, which go half way around, are slanted in the clockwise direction, as viewed in Fig. 4, while the teeth 24, which are disposed around the remaining half of the ring, are slanted in the counterclockwise direction. The ring is slightly dished so that the central part will clear the rim 18a of the nut and the washer 19 when the teeth engage the surface 26 of the recess.

As shown in the enlarged detail in Fig. 6, the teeth all have front faces, 23a and 24a, respectively, which lie substantially parallel to the axis of the locking ring, and sloping rear faces 23b and 24b. The faces 23b slope counterclockwise, so that the cutting edge of the teeth 23 presents maximum resistance to counterclockwise rotation of the ring with respect to the housing 13, and faces 24b slope clockwise so that the cutting edge of teeth 24 presents maximum resistance to clockwise rotation of the ring with respect to the housing. The ring is preferably made of hardened steel, and the housing of somewhat softer metal, so that the teeth will bite into the surface 26 of the housing.

The arm is assembled on the shaft by screwing the nut 18 on to threaded end 12, until the serrations 22 of the ring engage the mating serrations of shoulder 11. While the ring is still loose in recess 16 the arm may be adjusted to the exact rotational position desired with respect to the shaft. The nut is then further tightened to draw the ring against the casing and cause the teeth to bite into surface 26 of recess 16 and thus secure the housing firmly against rotation with respect to ring 17 and the shaft in either direction.

In the modification of Fig. 5, the nut 18 is mounted on a housing base 27 which is provided with a recess 28 in which the ring 17 is seated. A cover 29 is hinged to the housing on the same pin 14 as the arm 15. The recess 28 is closed by a bottom plate 30 which is secured to the housing base by a screw 31. This modification is applied to the shaft in the same manner as that previously described, the operation is in general the same, except that the cover 29 is swung back to give access to the nut and, after the coupling is tightened, is pushed down to the position indicated by the dotted outline 32, so that the nut 18 is completely enclosed.

In either modification the coupling is very compact, and consists of a minimum number of parts which can be easily manufactured. The rotational adjustment can be readily made while the coupling is engaged with the shaft, and, as the parts of the coupling are preassembled and secured together in the proper relationship, there is nothing to put together on the job and the parts cannot drop out and get lost when the arm is off the shaft.

What is claimed is:

1. A coupling, adapted to connect a windshield wiper arm to a shaft having a tapered shoulder and a threaded end, comprising a ring having an inner wall engaged with said shoulder, a base member to which the arm is attached, said member having an opening in which said threaded end is received, and an annular face surrounding said opening, a nut engaged with said threaded end and bearing on said base member and adapted to draw the shaft toward said face, said ring having an annular toothed surface surrounding said shaft and engaged with said face, said ring surface having teeth of substantial width in the radial direction adapted to bite into said face in a generally axial direction with respect to the shaft, substantially one-half said teeth being slanted clockwise with respect to the ring and the remainder being slanted counterclockwise.

2. A coupling as described in claim 1, each of said teeth having a front face disposed parallel to the axis of the ring and a back face disposed obliquely with respect to said axis.

3. A coupling as described in claim 1, the teeth around substantially one-half of the ring being slanted clockwise of the ring and the teeth around substantially the other half being slanted counterclockwise.

References Cited in the file of this patent

UNITED STATES PATENTS

| | | |
|---|---|---|
| 2,146,396 | Horton | Feb. 7, 1939 |
| 2,215,371 | Horton | Sept. 17, 1940 |
| 2,322,402 | Stuart | June 22, 1943 |
| 2,489,376 | Harper | Nov. 29, 1949 |
| 2,628,113 | Jones | Feb. 10, 1953 |